United States Patent
Turner (10) Patent No.: US 12,128,708 B2
(45) Date of Patent: Oct. 29, 2024

(54) BELL LOCK SAFETY RESTRAINT FOR WHEEL ASSEMBLIES

(71) Applicant: WheelSafe Technology, Inc., Calumet, OK (US)

(72) Inventor: William Turner, Yukon, OK (US)

(73) Assignee: WheelSafe Technology, Inc., Calumet, OK (US)

( * ) Notice: Subject to any disclaimer, the term of this patent is extended or adjusted under 35 U.S.C. 154(b) by 1022 days.

(21) Appl. No.: 16/867,007

(22) Filed: May 5, 2020

(65) Prior Publication Data

US 2021/0347202 A1     Nov. 11, 2021

(51) Int. Cl.
*B60B 3/14* (2006.01)

(52) U.S. Cl.
CPC ........ *B60B 3/142* (2013.01); *B60B 2900/731* (2013.01)

(58) Field of Classification Search
CPC ................................ B60B 3/142; B60B 3/14
See application file for complete search history.

(56) References Cited

U.S. PATENT DOCUMENTS

| | | | |
|---|---|---|---|
| 3,486,797 A | 12/1969 | Osborne | |
| 3,944,285 A | 3/1976 | Vincent | |
| 5,431,485 A * | 7/1995 | Hayashi | B60B 3/10 301/9.1 |
| 5,560,687 A | 10/1996 | Jagelthorn | |
| 5,795,037 A | 8/1998 | Hagelthorn | |
| 5,887,952 A * | 3/1999 | Gandellini | B60B 3/142 301/35.63 |
| 5,954,151 A | 9/1999 | Cocharane et al. | |
| 6,070,893 A | 6/2000 | Thorndyke et al. | |
| 6,106,076 A * | 8/2000 | Gandellini | B60B 3/165 301/35.63 |
| 7,000,995 B2 | 2/2006 | Hagelthorn | |
| 7,228,932 B2 | 6/2007 | Rosenthal et al. | |
| 7,547,077 B2 | 6/2009 | Melberg et al. | |
| 7,922,258 B2 * | 4/2011 | Baumann | B60B 3/16 301/111.01 |
| 9,970,486 B2 | 5/2018 | Hagelthorn | |
| 10,112,436 B2 * | 10/2018 | Denmead | B60B 3/16 |
| 10,987,973 B2 * | 4/2021 | Turner | B60B 35/08 |
| 11,084,324 B2 * | 8/2021 | Turner | B60B 35/04 |
| 2003/0015909 A1 | 1/2003 | Meek, Jr. | |
| 2010/0266331 A1 * | 10/2010 | Peterkort | F16C 43/04 301/110 |

(Continued)

FOREIGN PATENT DOCUMENTS

WO     9505291     2/1995

OTHER PUBLICATIONS

Park, Jim; "Why do wheels come off trucks?", Oct. 7, 2013; retrieved Dec. 19, 2018 from https://www.truckinginfo.com.

(Continued)

*Primary Examiner* — Jason R Bellinger
(74) *Attorney, Agent, or Firm* — Dunlap Codding, P.C.

(57) ABSTRACT

A bell lock wheel restraint system having an axle adapter to attach a bell to an axle, wherein the bell engages an outside face of a wheel away from a vehicle on which the wheel is mounted, and a bell retainer that secures the bell onto the axle adapter, thereby securing the wheel onto the vehicle in lieu of one or more failed lug bolts or lug nuts.

13 Claims, 8 Drawing Sheets

(56) References Cited

U.S. PATENT DOCUMENTS

2013/0213764 A1     8/2013   Lawless

OTHER PUBLICATIONS

Crosby Group LLC; "Angular Contact Bearing Swivels"; 2017.
ESCO Corp.; "Rigging Products Specifications"; document P7000RIG01L0112.
Hanes Supply Inc.; "Section 3: Wire Rope Assembly and Fittings", pp. 3-A, et seq.
Hendrickson; "Technical Procedure: Trailer suspension systems standard wheel service wheel-end"; Mar. 2018, document Lit No. L496, Revision 1.
Park, Jim; "Keeping your wheels on", Oct. 15, 2013, retrieved Dec. 19, 2018 from https://www.truckinginfo.com.
Monster, R. F.; "Wheel separations from commercial vehicles: Experiences in Ontario", 2004; Proceedings of the Canadian Multidisciplinary Road Safety Conference XIV.
National Transportation Safety Board; "Safety Recommendation", Oct. 23, 1992; retrieved from https://www.ntsb.gov/safety/safety-recs/recletters/H92_98_101.pdf.
PWB Anchor; "Product Catalogue—2014 Edition".
VIS Automation Service; "Squirrel Wheel Safety Device"; retrieved Dec. 26, 2018 from http://demarytruck.com/tire- squirrel/.
The Cable Connection; "Wire Rope Assemblies and Fittings", 2009.
GMB; "Wheel bearing parts"; retrieved on Jul. 14, 2019 from https://www.gmb.jp.

\* cited by examiner

BELL LOCK SAFETY RESTRAINT FOR WHEEL ASSEMBLIES

INCORPORATION BY REFERENCE

U.S. patent application Ser. No. 16/514,187, filed on Jul. 17, 2019, and issued on Aug. 10, 2021 as U.S. Pat. No. 11,084,324 B2 (hereinafter the '324 patent) by William Turner, is incorporated by reference in its entirety.

FIELD OF THE INVENTION

The present invention generally relates technologies to prevent run-away wheel assemblies after a mechanical failure such as a lug or lug nut failure on an over-the-road trailer.

BACKGROUND OF INVENTION

U.S. patent application Ser. No. 16/514,187, filed on Jul. 17, 2019, by William Turner, is incorporated by reference in its entirety. For the purposes of this disclosure, the term "hollow trailer axle" shall refer to any of a variety of axles employed on a variety of towed trailers, such as over-the-road semi-trailers, tractor trailers, and the like, as well as any other axle for a vehicle which is hollow through its core. Lugs shall refer to the threaded studs which receive a wheel and a lug nut or other retention device to secure a wheel onto a towed trailer or onto a vehicle such as, but not limited to, a truck, bus or car.

As illustrated and described in U.S. patent application Ser. No. 16/514,187, filed on Jul. 17, 2019, by William Turner, a hollow trailer axle generally comprises a larger diameter center portion, with a smaller diameter hub portion at either end. The hub portions and center portion are generally constructed of sections of high-strength round metal tubes, such that the core of the axle from end to end is hollow. The transition between the hubs and the center portion may include several steps, flares, and increments in order to receive and axially-orient the components of the brake and wheel assemblies. The hubs themselves may be parallel (straight) (as shown) or tapered. Hubs are typically provided with threads on the outside surface for receiving one or more spindle nuts.

Figure 9:
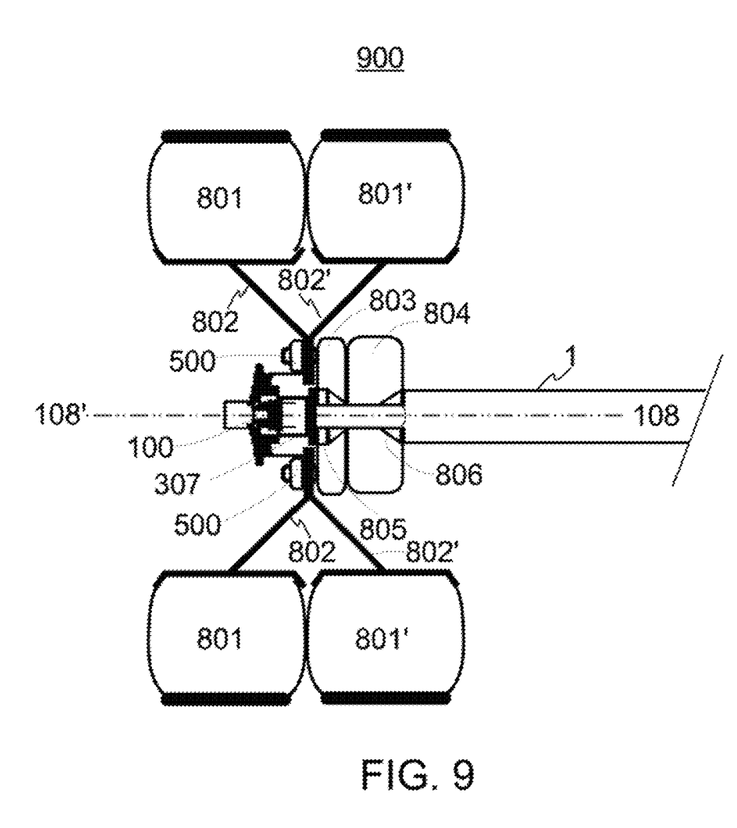
FIG. 9 provides a cut-away view of a manner of use of the example embodiments of FIGS. 1-8.
Figure 10:
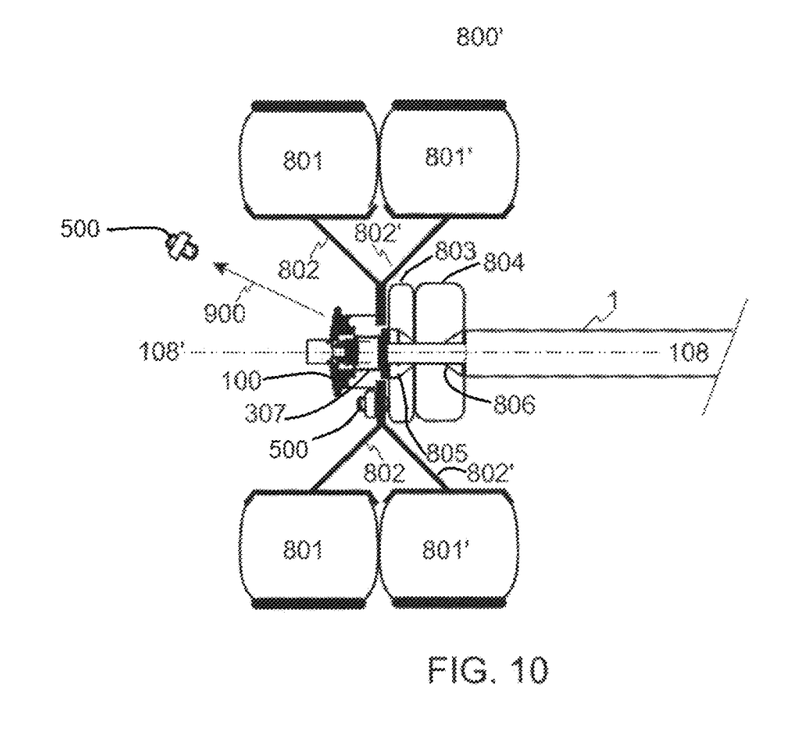
FIG. 10 illustrates the retention function of the of the example embodiments of FIGS. 1-8.

As depicted in FIGS. 9 and 10, a generalized set of components are received onto a hub 803, aligned on the center of the axle 1. Generally speaking, an inner bearing group of components is received onto the axle 1, which might include an inner bearing 806 and a hub seal 307. Then, a brake system 804 and the hub 803 with lugs 500 are received onto the axle 1. These may include an air disc brake (ADB) hub and rotor assembly, a standard service conventional hub without a brake system, a cast spoke hub without a brake system, etc. Next, an outer bearing 805 is received onto the axle 1, and secured by a spindle nut system. A spindle nut system may include an inner adjusting nut with lock washer, set screw, star lock washer, and an outer jam nut; a castle nut washer with castle nut and cotter key; or a one-piece spindle nut such as a Stemco™ PRO-TORQ™ nut with a retainer ring.

After the spindle nut system is installed, a hub cap gasket and a hub cap are installed to cover and protect the greased bearings, and to close the end of the hollow spindle to the outside environment. The hub cap is typically secured by a series of small bolts around the periphery of a mounting ring formed in the hub cap. Optionally, if the hub cap is provided with a hubcap oil fill port, a dust cap is secured to the hub cap using a set of bolts, yielding an assembled hub assembly.

Subsequently, the wheel(s) with tires are passed over (around) the hub cap and dust cover to align mounting holes in the wheel(s) with the lug bolts on the hub, receiving the lug bolts through the wheel mounting holes. Lug nuts are threaded onto the lug bolts, tightened to torque levels appropriate for the particular wheel, trailer, vehicle, and load range, to yield a mounted wheel assembly.

While the lug bolts, lug nuts, and their current torque levels are readily inspected by a truck driver or repair technician, the state of the bearings is not without disassembly of these components. The inner bearings are essentially impossible to inspect without disassembly, which is a time consuming task. And, the re-assembly may lead to errors which were not originally present prior to the inspection effort. Further, lug bolts and lug nuts suffer slight deformation each time they are removed and re-tightened, such that each lug bolt and lug nut has a limited lifetime in which they can withstand their specified load forces. This deformation and wear is nearly impossible to determine through inspection while the lug bolts and nuts are installed on a trailer or vehicle, and logs kept to attempt to record the number of installations and re-tightenings of each lug bolt and lug nut are tedious to maintain, therefore, are unreliable.

Mounted wheel assemblies fail in generally two modes: bearing failure and lug assembly failure. In the first mode, when a wheel bearing fails, the components of the assembly shift off center, and it generally causes enough torque, heat and abrasion that the spindle nut system fails, so the wheels and tires with the still-attached hub and brake system, fly free of the axle assembly as a sub-assembly, often at a high rate of speed. In the second mode of failure, one or more lug bolts and/or lug nuts fail, such as snapping off or thread stripping from over-torqueing, which leads to excessive force on the remaining lug bolts and nuts. Those remaining lug bolts and nuts then fail due to overstress, and the wheel and tire combination flies free of the axle and the rest of the mounted wheel assembly components. In either mode of failure, combining the speed with the weight of the breakaway wheels, tires and sub-assembly, which can weigh as much as 700 pounds, a very dangerous projectile is now loose and out of control. It can travel a great distance before stopping, causing considerably property damage, as well as injury and death to people and livestock.

The foregoing descriptions of wheel mounting failure scenarios are provided for general reference only, and represent the functional components of a typical trailer axle, hub and wheel system. In actual products, numbers of components, sizes, order of assembly, and component names may vary to some degree, while still being represented by the generalizations of these figures.

SUMMARY DISCLOSURE OF THE INVENTION

A plurality of exemplary embodiments are disclosed for a bell lock wheel restraint system having an axle adapter to attach a bell to an axle, wherein the bell engages an outside face of a wheel away from a vehicle on which the wheel is mounted, and a bell retainer that secures the bell onto the axle adapter, thereby securing the wheel onto the vehicle in lieu of one or more failed lug bolts or lug nuts.

BRIEF DESCRIPTION OF THE DRAWINGS

The description set forth herein is illustrated by the several drawings, which are not necessarily drawn to mechanical scale.

DETAILED DESCRIPTION OF EMBODIMENT(S) OF THE INVENTION

The inventor of the present invention has recognized a problem in the art not previously recognized or addressed regarding prevention of run-away, break-away or fly-away semi-trailer wheels. The present inventor has recognized that some run-away, break-away or fly-away semi-trailer wheels are due to bearing failures are difficult to prevent, and that existing technologies on the market are insufficient and/or ineffective for a number of reasons. The present inventor filed U.S. patent application Ser. No. 16/514,187 on Jul. 17, 2019, to address this unmet need in the art, which disclosed a tether system which is disposed through the hollow core of a truck trailer axle and which is connected through one or more swivel bearings to specialized hardware on both ends of the axle. In this manner, when a bearing fails, the wheel assembly may collapse under the axle, but is otherwise prevented from departing at a high speed away from the trailer.

While this related invention is useful for preventing a percentage of run-away trailer wheels, it does not address wheels which come loose from trailers and from other vehicles, such as the trucks which pull trailers, nor does it address wheels which break loose due to lug bolt or lug nut failure. The present invention will be disclosed in a manner which uses a hollow trailer axle as the example environment, in conjunction with the related tether invention. However, it will also be readily understood by those having ordinary skill in the art that the present invention is equally useful and effective in meeting its objectives when used without such a through-axle tether, on solid axles, and on other wheel mounts which do not have axles, such as solid-axle trailers, truck front wheels, and truck drive wheels.

Therefore, the following structures are disclosed which are exemplary of the invention which is inexpensive, effective, and readily installed on existing wheel assemblies. While certain components and certain dimensions and specifications may be disclosed, it will be recognized by those skilled in the art that certain substitutions may be made without departing from the spirit and scope of the present invention. For example, all components are preferably design to withstand a force of at least 24,000 pounds for embodiments which are to be used with a long-haul over-the-road (OTC) trailer in North America, but may be designed to withstand different forces for smaller trailers, buses, vehicles, etc.

Figure 1:
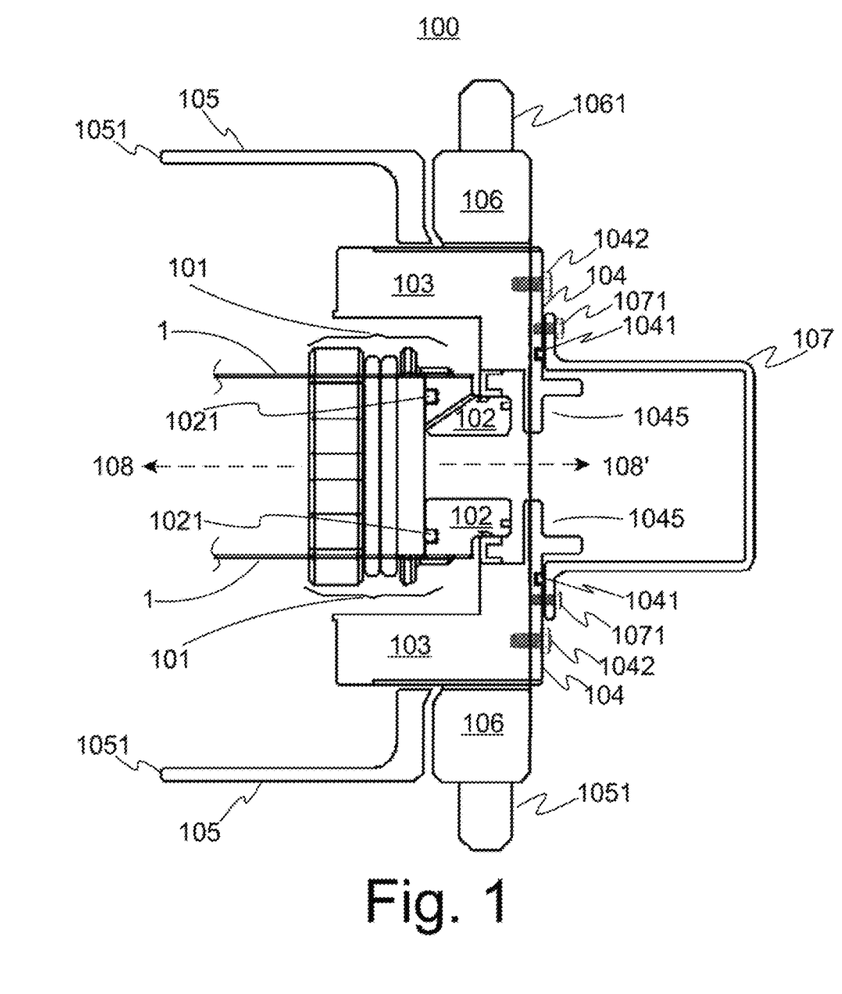
FIG. 1 depicts a cut-away view of an exemplary bell lock system of assembled components according to the present invention is shown.

Turning to FIG. 1, a cut-away view of an exemplary bell lock system of assembled components 100 according to the present invention is shown. In this view, all components are essentially symmetric (round or circular) about an axis 108, 108' through the center of an axle 1, such as a hollow trailer axle, solid axle (e.g., trailer, truck, bus, vehicle, etc.) or other wheel mount (e.g., front pivoting wheel for steering, etc.). We will return to FIG. 1 after discussion of each of the components, as shown in an unassembled, exploded view of FIG. 2.

Figure 2:
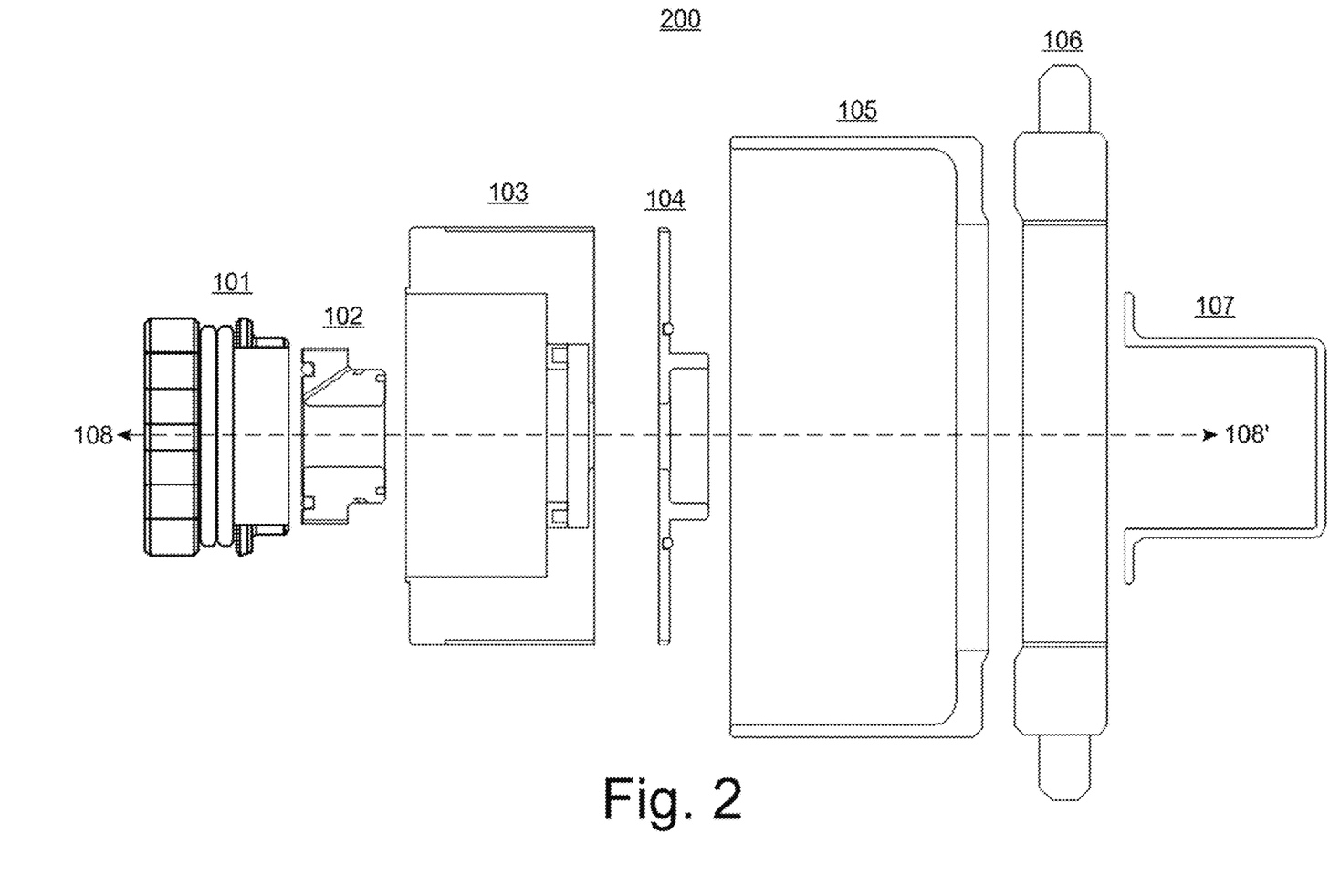
FIG. 2 sets for major components of an exemplary embodiment according to the present invention in unassembled exploded view.

Referring now to FIG. 2, the major components of the exemplary embodiment 100 according to the present invention are shown in unassembled relative alignment 200 exploded view for concentric assembly about the common axis 108, 108'. The major components of this bell lock embodiment are:

(a) bearing nut 101;
(b) spindle seal 102;
(c) threaded hub 103 with plate 104 with optional bearing register for cooperation with the optional tether companion system;
(d) bell 105;
(e) hammer nut 106; and
(f) hub cap or dust cover 107.

Many details are not labelled in FIG. 2 for clarity purposes, which will be labelled and discussed in other figures and paragraphs herein. Assembly of this example embodiment is essentially from left to right 101-106 to yield the axle-mounted system 100 of FIG. 1, and disassembly is from right to left 106 to 101.

Figure 3:
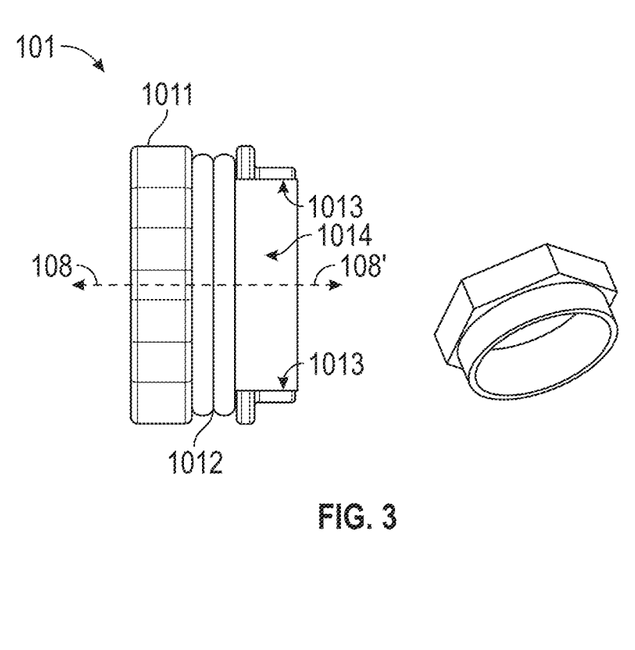
FIG. 3 sets forth more details of an example bearing nut according to an example embodiment.

FIG. 3 sets forth more details of an example bearing nut 101 according to the example embodiment. The bearing nut has a cylindrical hollow core about the axis 108, 108', preferably with flat faces 1011 provided around an outer periphery for receiving a wrench in order to install and uninstall the bearing nut to and from an axle end. Provided on an inside surface of this periphery are threads suitable to mate with existing threads found around the outer surface of an axle, typically a section of threads adjacent to the usually packing nut holding the wheel bearings in place of a typical wheel assembly. In this manner, the new bearing nut 101 is installed directly onto pre-existing threads on an axle using a wrench. A bearing, such as a slip bearing 1012, is provided between the wrench faces portion and a threaded portion 1013 to receive a spindle seal 102.

Figure 4:
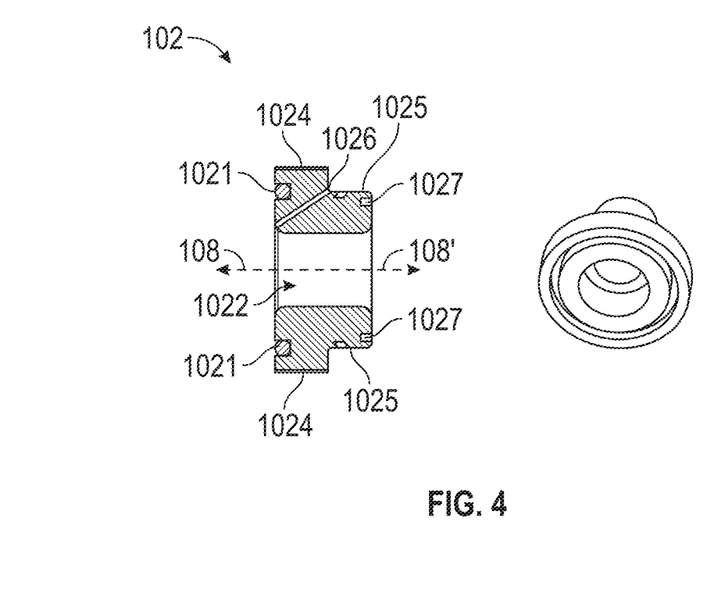
FIG. 4 illustrates an example spindle seal according to the example embodiment.

FIG. 4 illustrates an example spindle seal 102 according to the example embodiment. The spindle seal 102 also has a cylindrical hollow core 1022 about the axis 108, 108', and, in this embodiment, it has threads 1024 to be received into the threads 1013 of the bearing nut 101. In this embodiment, it has a portion with a reduced diameter which is provided with threads 1025 around the portion periphery to receive the threaded hub 103 and/or the plate 104, including holes 1027 for receiving the prongs of a spinner wrench for installing and removing the spindle seal. This embodiment includes a seal 1021, such as a round bead seal, which, when received into the bearing nut 101, engages a flat surface in the bearing nut to seal the oil the bell lock system from getting into the standard hub and wheel bearings. Also in this example embodiment, an air vent 1026 is shown.

Figure 5:
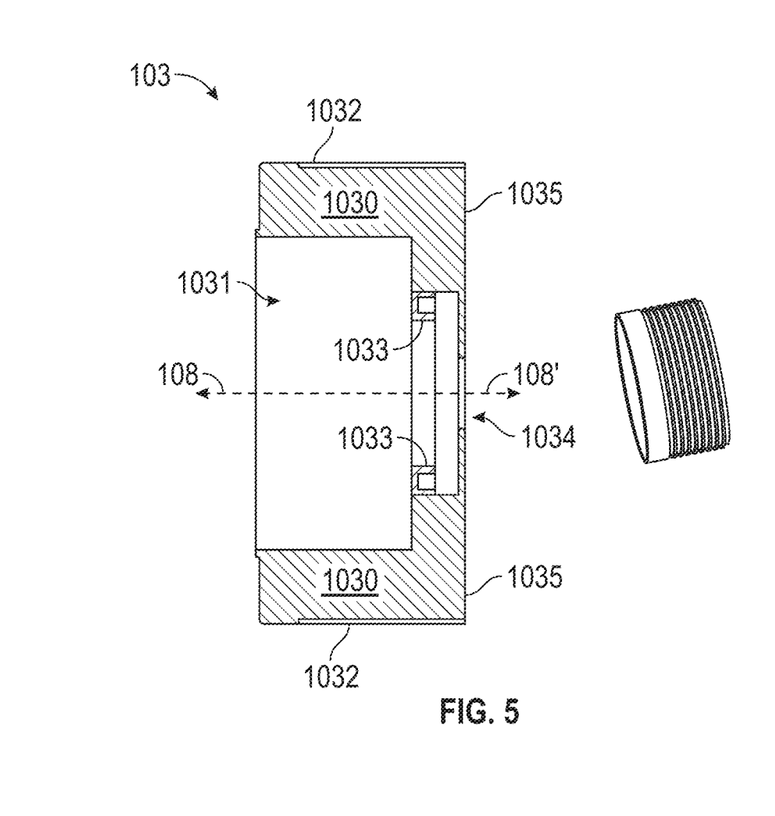
FIG. 5 illustrates an example embodiment, according to the present invention, of a threaded hub.
Figure 6:
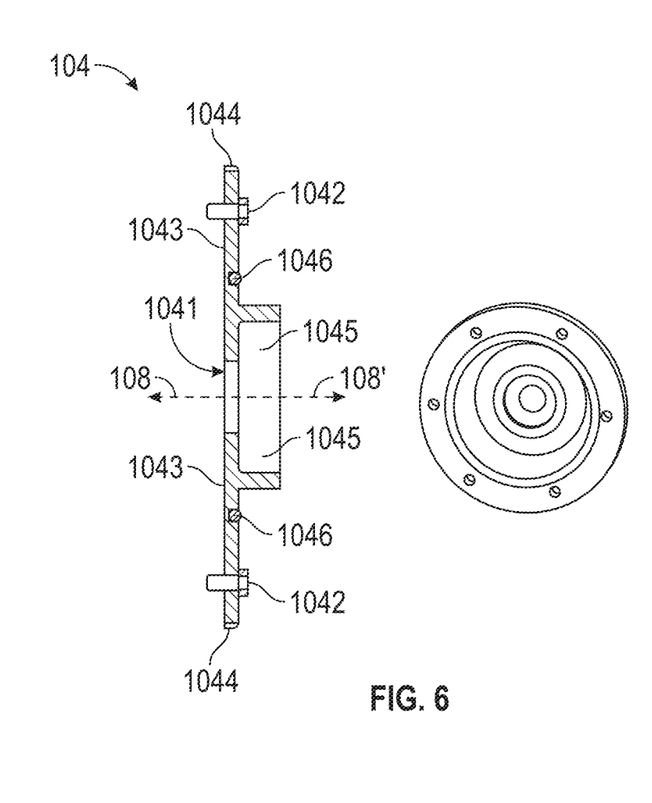
FIG. 6 illustrates an example embodiment, according to the present invention, of a plate with an optional tether bearing register.

FIGS. 5 and 6 illustrate examples of a threaded hub 103 and a plate 104 with optional tether bearing register, respectively, according to the example embodiment. In some embodiments, the functions of these two components may be integrated into a unitary component, depending on fabrication processes such as machining versus casting. The threaded hub also has a cylindrical hollow core 1031 about the axis 108, 108', and, in this embodiment, the plate 104 has an orifice 1041 formed about the axis 108, 108'. The threaded hub 103 of this example embodiment has a cylindrical body 1030, which has threads 1032 about the exterior periphery, and a front (outside, away from the vehicle) face 1035, with an orifice 1034 to match the orifice 1041 of the plate 104. Interior to the threaded hub 103 are provided mating threads 1033 to engage the threads 1025 of the reduced diameter portion on the spindle seal 102.

The plate 104 example embodiment of FIG. 6 includes a flat, generally disk-like body 1043, with an optional bearing register 1045 to receive the bearings for the optional tether as set forth in the aforementioned related patent application. The plate may have threads 1044 around its periphery, if the diameter of the plate is sufficiently great to match up to the threads 1032 on the threaded hub 103. Fasteners 1042 may be received through the plate in a manner to secure it to the face 1035 of the threaded hub 103. A seal 1046, such as a bead style seal, is provided to the plate in order to engage a flange of a hub cap (i.e., dust cover) 107.

Figure 7:
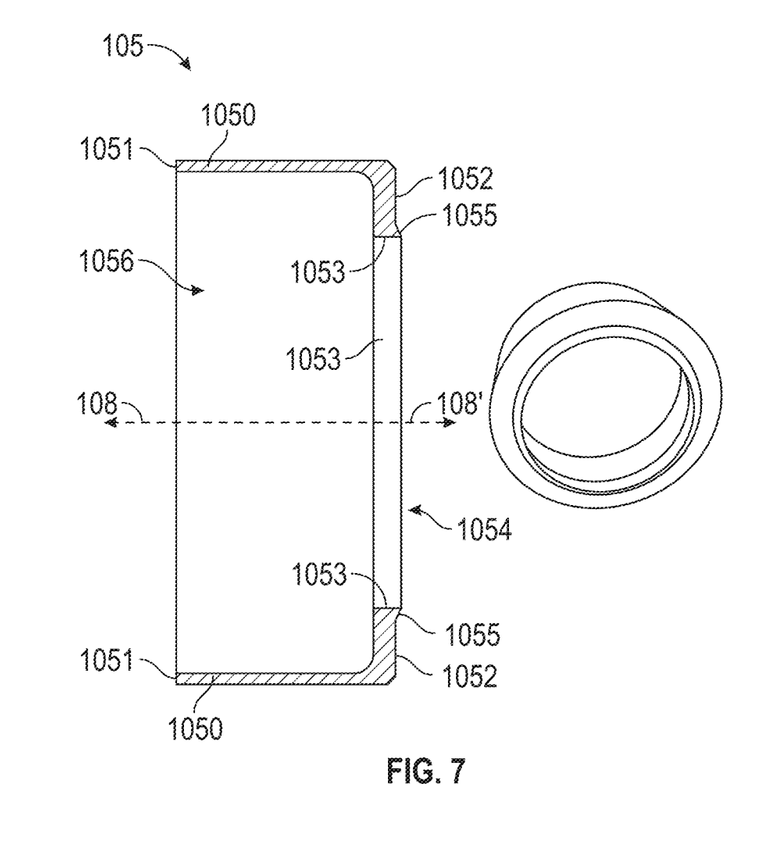
FIG. 7 illustrates an example embodiment, according to the present invention, of a bell.
Figure 8:
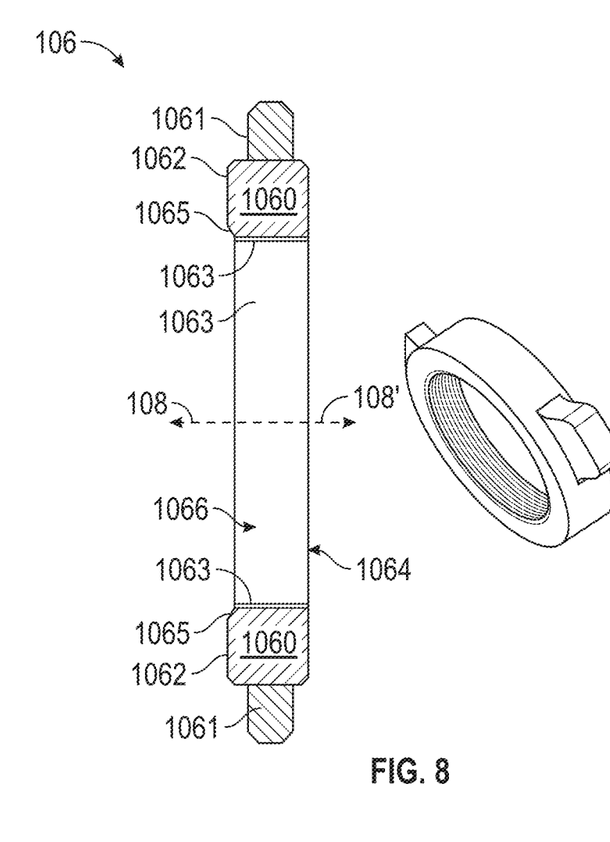
FIG. 8 illustrates an example embodiment, according to the present invention, of a hammer nut.

FIGS. 7 and 8 illustrate a bell 105 and a hammer nut 106, respectively, according to the example embodiment. Both the bell 105 and the hammer nut 106 have circular bodies 1050 and 1060, respectively, with generally cylindrical hollow cores 1056 and 1066, respectively, about the axis 108, 108'. The bell 105 is configured and dimensioned to fit over the assembled bearing nut 101, spindle seal 102, and threaded hub 103 with plate 104 such that its inside edges 1051 (towards the axle, towards the wheel) contact the outside face of the wheel it protects when the bell is threaded 1053 onto the threaded hub's threads 1032. After it is hand tightened in contact with the wheel it protects, the hammer nut 106 is threaded 1063 onto the threaded hub's threads 1032 until its inside face (towards the wheel) 1062 comes into frictional contact with the bell's outside face 1052. Wings 1061 which extend from the hammer nut 106 are then used to tighten the hammer nut against the bell, such as by striking the wings with a dead blow hammer, engaging it as a lock nut against the bell, and subsequently, against all the previously-threaded and nested components of the bell lot system. Please note that, in this example embodiment, a flare 1055 and a mating seat 1065 are formed in the bell and the hammer nut to promote self-centering of the two components, as they are likely large and fairly heavy components.

FIG. 9 provides a cut-away view of a manner of use 900 of the example embodiment 100 disclosed in the foregoing paragraphs. It is attached or installed onto the existing axle 1 concentric with the rest of the mounted wheel assembly, including the hub 803, an outer wheel 802, and an inner wheel 802'. The bell lock system spins freely with respect to the axle 1, due to the bearing nut, but otherwise is affixed solidly such that the bell's edges are in contact with the outer wheel 802, preferably without visually obscuring the lug bolts and lug nuts 500. When a lug bolt or lug nut 500 fails 900, the one or more tires 801, 801', and the one or more wheels 802, 802' are retained onto the axle 1 by the bell lock system 100, as illustrated 800' in FIG. 10.

It should be noted that we have not, to this point, specified a threading direction for all of the components of the bell lock system. Preferably, the threading directions of all components of the bell lock system are keyed to the side of the vehicle to which they are to be mounted, and are counter-rotational to the forward movement of the wheels. In this manner, when a lug bolt or lug nut fails and the wheel begins to press outward (away from the vehicle) on the bell lost system, all system components are twisted and rotated in a direction which tightens their attachment rather than loosens their attachment. For example, on the left side of the vehicle oriented facing forward motion (i.e., driver side in North America), the system components are provided with left-hand threading (opposite of standard threading), and on the right side of the vehicle (i.e., passenger side in North America), the system components are provided with right-hand threading (standard threading clockwise tightens, counterclockwise loosens). Additional measures to secure the components in their installed positions may be employed, such as set screws, pins, etc.

Figure 11:
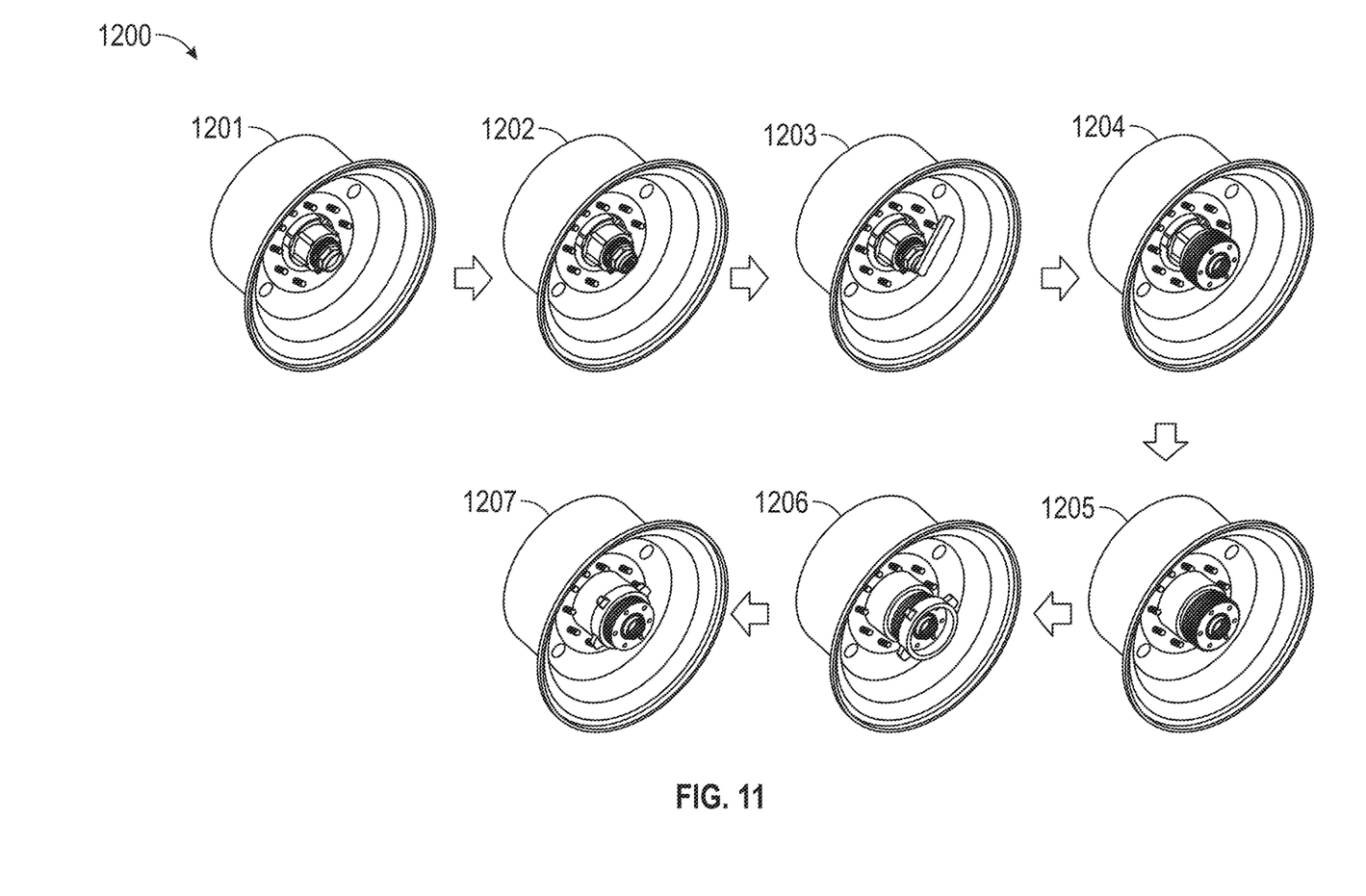
FIG. 11 illustrates the installation process of the example embodiments of FIGS. 1-8.

FIG. 11 illustrates the installation process 1200 which may be evident from the other diagrams, but is explicitly illustrated for clarity here. A wheel (with or without installed lug nuts) is centered onto a mounted wheel assembly with the hub cap removed. In practice, the system can be installed on a wheel which is mounted on a trailer or vehicle without removing lug nuts, and without raising the trailer or vehicle (i.e., without jacking up the trailer or vehicle or putting it on a lift). With the normal hub cap removed, the new bearing nut 101 is threaded 1201 onto the exposed portion of the threaded axle until it comes into contact with the castle nut of the standard wheel assembly. Then, the spindle seal 102 is threaded 1202 into the interior of the new bearing nut 101, where it is tightened 1203 using a specialized tool such as a spinner wrench with two or more posts protruding from the wrench's face to engage two or more holes in the outer face of the spindle seal 102.

Next, the threaded hub 103 and plate 104 are threaded 1204 onto the exterior threads of the spindle seal 102, and secured using fasteners as applicable to the particular embodiment, such as counter-sunk bolts using an Allen wrench. Now, the bell 105 is threaded 1205 over the exterior threads of the threaded hub 103 until the inside (wheel-facing) edges of the bell come into frictional contact with the wheel. The hammer nut 106 is also threaded 1206 over the exterior threads of the threaded hub 103 until its inside face comes into frictional contact with the outside (away from the wheel) face of the bell 105, and it is further tightened using the wings by striking it with a dead blow hammer, creating a lock nut arrangement 1207 against the bell. Finally, a hub cap or dust cover 107 is installed onto the outside face of the plate if no tether is to be used in conjunction with the bell lock. Otherwise, the end of a tether such as the one described in the related and incorporated '324 patent application is secured into the bearing register of the plate. Finally, a dust cover is installed over the plate to engage the dust cover seal and finish the installation. Removal of the bell lock system is achieved by reversing the process 1200.

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A bell lock wheel restraint system comprising:
   an axle adapter at least a portion of which is configured to attach to pre-existing threads around an outer surface of an axle of a vehicle; and
   a bell configured to be received and retained onto the axle adapter, and configured to engage a first face of a wheel opposite of a second face of the wheel wherein the second face is engaged to a hub of the vehicle thereby retaining the wheel onto the hub of the vehicle without relying upon one or more failed lug bolts or lug nuts associated with the wheel.

2. The system as set forth in claim 1 wherein the axle adapter comprises a rotational bearing between an axle and the bell.

3. The system as set forth in claim 1 wherein the axle adapter comprises a spindle seal configured to receive the bell.

4. The system as set forth in claim 1 further comprising a retaining nut configured to retain the bell to the axle adapter.

5. The system as set forth in claim 4 wherein the retaining nut comprises one or more wings for receiving blows from a hammer to tighten the retaining nut.

6. A method of providing a bell lock wheel restraint system comprising:
   attaching an axle adapter to pre-existing threads around an outer surface of an axle of a vehicle; and
   receiving and retaining a bell onto the axle adapter to engage a first face of a wheel opposite of a second face of the wheel wherein the second face is engaged to a hub of the vehicle, thereby retaining the wheel onto the hub of the vehicle without relying upon one or more failed lug bolts or lug nuts associated with the wheel.

7. The method as set forth in claim 6 wherein the axle adapter comprises a rotational bearing between the axle and the bell.

8. The method as set forth in claim 6 wherein the axle adapter comprises a spindle seal configured to receive the bell.

9. The method as set forth in claim 6 further comprising a retaining nut configured to retain the bell component to the axle adapter.

10. The method as set forth in claim 9 wherein the retaining nut comprises one or more wings for receiving blows from a hammer to tighten the retaining nut.

11. An apparatus for restraining at least one wheel assembly mounted on an axle assembly wherein the axle assembly comprises an axle and a hub with lugs rotatably mounted on the axle, the at least one wheel assembly comprising a wheel and a tire and being mountable on the hub with lugs, the apparatus comprising:
    a threaded hub rotatably connectable to the axle and having threads extending along an outer periphery thereof;
    a bell having an annular rim and positionable over the threaded hub so the annular rim of the bell is engageable with the wheel of the wheel assembly when the wheel assembly is mounted on the hub with lugs; and
    a bell retainer threadingly engaged with the threads of the threaded hub so the bell is secured between the wheel assembly and the bell retainer when the wheel assembly is mounted on the hub with lugs.

12. An axle assembly, comprising
    an axle body with at least one end;
    a hub with lugs rotatably mounted on the first end of the axle body, at least one wheel assembly comprising a wheel and a tire being mountable on the hub with lugs;
    a threaded hub rotatably connected to the first end of the axle and having threads extending along an outer periphery thereof;
    a bell having an annular rim and positioned over the threaded hub so the annular rim of the bell is engageable with the wheel of the wheel assembly when the wheel assembly is mounted on the hub with lugs; and
    a bell retainer threadingly engaged with the threads of the threaded hub so the bell is secured between the wheel assembly and the bell retainer when the wheel assembly is mounted on the hub with lugs.

13. A method of restraining a wheel assembly mounted on an axle assembly wherein the axle assembly comprises an axle body with at least a first end and a hub with lugs rotatably mounted on the first end of the axle body, the wheel assembly mounted on the hub with lugs, the method comprising:
    connecting a threaded hub to the first end of the axle body so the threaded hub is rotatable relative to the axle body;
    positioning a bell having an annular rim over the threaded hub so the annular rim of the bell is engaged with the wheel assembly; and
    threadingly engaging a bell retainer with the threads of the threaded hub so the bell is secured between the wheel assembly and the bell retainer.

* * * * *